Sept. 18, 1951 M. D. HEYMAN 2,568,004
METHOD OF APPLYING PROTECTIVE COATINGS
OF MICA TO SOLID SURFACES
Filed Feb. 13, 1950
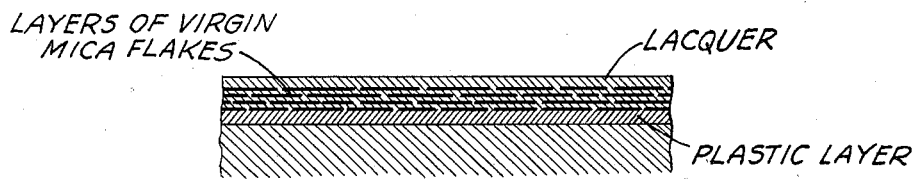
INVENTOR
MOSES D. HEYMAN
BY
ATTORNEY Patented Sept. 18, 1951

2,568,004

UNITED STATES PATENT OFFICE 2,568,004

METHOD OF APPLYING PROTECTIVE COATINGS OF MICA TO SOLID SURFACES

Moses D. Heyman, Woodmere, N. Y., assignor to Integrated Mica Corporation, Woodmere, N. Y., a corporation of New York Application February 13, 1950, Serial No. 143,921

4 Claims. (Cl. 117—72)

The present invention relates to a method of applying a protective coating on metals and other materials.

The primary object of the invention is to provide a novel method of applying a protective coating in which mica is the principal ingredient.

This application is a continuation-in-part of my pending application filed December 6, 1945, Serial Number 633,114, now abandoned.

The great durability of mica is well known. Whereas wood will rot, metals, including the ferrous group, will wear away and will rust, and stone will decompose, mica is apparently unaffected by the forces that cause the corrosion and erosion of other materials. In its natural state, mica is found in granite formations. Although granite is one of the hardest and toughest of minerals, large blocks of mica are frequently found protruding from a granite mass, indicating that the elemental forces which erode granite have little or no effect on the mica. Mica is chemically insoluble, is highly resistant to acid, and will not chemically combine with other materials. Another important property of mica is that it will not oxidize. Further, mica is harmless, plentiful and inexpensive, is a good insulator of electricity and heat, has a low specific gravity, and will not set up electrolytic corrosive forces or actions when in contiguity with metals.

Another property of mica is the strong affinity the flakes thereof have for each other. I have found that a piece of mica can be disintegrated into relatively small flakes that will re-cohere with considerable force, provided that the surfaces of the flakes have not been contaminated by a too long exposure to the atmosphere or have been otherwise contacted by other substances. In other words, mica can be split, and by retaining the virgin state of the surfaces of the splittings, the same will re-cohere to form a durable mica sheet as explained in my Patent No. 2,405,576, issued August 13, 1946, and entitled Integrated Mica and Method of Making the Same.

An object of this invention is to provide a protective coating of great durability.

Another object of the invention is to provide a protective coating that is substantially chemically inert and acid resistant.

Another object of the invention is to provide a protective coating that will resist oxidation to a high degree.

A further object of the invention is to provide a protective coating that is a good insulator of both electricity and heat and that will not set up electrolytic actions between itself and the material on which it is applied.

A still further object of the invention is to provide a protective coating of low specific gravity to materially reduce the weight of said coating on large structures such as ships, bridges, etc.

A yet further object of the invention is to provide a protective coating that will not burn and will increase the fire-proof properties of a material coated therewith.

The invention further contemplates a novel method for applying a protective coating having the properties outlined in the foregoing objects of the invention.

The foregoing objects and other objects, features, and advantages of the invention will become more clearly apparent from the following description of the herein contemplated coating, the accompanying drawing providing the general basis of said description.

In the drawing:

The figure is a greatly enlarged cross-sectional view of a protective coating according to this invention.

In this specification, the terms "integrated mica," "plastic layer" or "plastic solution," and "lacquer or filler" will be used. For the purposes of this disclosure and claims these terms are defined as follows:

Integrated mica.—A layer, sheet, or the like comprising mica splittings or flakes that have been split in a fluid medium whereby the virginity of their surfaces have been retained so that said flakes will re-cohere readily and with considerable force after the fluid has been evaporated or otherwise removed. A fuller explanation of integrated mica will be found in the mentioned patent and also in my Patent No. 2,490,129, issued December 6, 1949, and entitled Method and Apparatus for Fabricating Mica. As explained in these patents, I have found that the natural cohesive force resident in the flakes is retained when the liquid medium is distilled water or methyl alcohol. These liquid-borne virgin-surfaced flakes—flakes that have nascent surfaces—are then deposited on a suitable liquid-pervious surface when integrated mica sheets are desired. As more fully detailed in said patents, after blocks of mica are first cleansed to rid the same of dirt, stones, and other impurities, and then dried to rid the blocks of cleansing fluid, splitting of the blocks is instituted. By means of a splitting device which I have devised, the mica blocks or pieces are carried in cross currents of liquid that enters the same in the form of a high pressure jet or jets. These liquid-borne pieces twist and twirl in the cross currents created by the jets which, therefore, have many opportunities to strike the edges of the mica pieces to split the same. Splitting also results from the increased velocity of the jet-struck pieces moving through the liquid medium. Continued splitting of the mica pieces will result in such extremely thin particles of flakes, that the same will float out of the splitting device in the liquid emanating therefrom. I have found these flakes to have a thickness in the nature of .0001 of an inch and with the properties mentioned herein.

*Plastic layer or plastic solution.*—Any suitable varnish, resin, phenolic compound, or the like, and particularly one that is soluble in a liquid medium in which virgin mica flakes are held in suspension.

*Lacquer or filler.*—Any suitable varnish or shellac, resin, or other base having the property of drying to form a hard but elastic and pliable coating.

My research has taught me that the liquid-borne flakes, as above, will not only re-cohere among themselves but will also firmly adhere to absolutely clean surfaces of wood or metal. I have found that it is possible to apply the liquid-borne virgin mica flakes onto the freshly planed surface of a piece of wood or onto a thoroughly clean and smooth surface of a piece of metal or plastic to, thereby, deposit a mica layer that will adhere to such surfaces.

In most instances, however, it is extremely difficult to provide suitably clean surfaces on wood, metal and plastic materials—surfaces that are completely free of dust, dirt or other contamination. Therefore, I first prefer to deposit a plastic layer on the surface to be coated, having found that the liquid-borne mica flakes adhere satisfactorily thereto.

Since a layer of mica flakes is hygroscopic and of a capillary nature, having a multiplicity of pores or interstices among the flakes, the same cannot be used as a protective coating unless the interstices among the flakes are filled up. This is readily done by applying a coating of lacquer or filler onto the mica layer after the same has dried. The purpose of this lacquer or filler coating is not so much to form a cover over the mica itself but to be absorbed by the mica layer and fill its pores, making the mica non-hygroscopic and non-capillary. Consequently, the outer layer of lacquer or filler may wear away and disappear with time, but such wear will have little effect upon the life of the mica coating. Such a layer of lacquer or filler need not necessarily be replaced when worn off, because the protection is afforded by the mica and the filler serves only the purpose of filling the interstices of said mica.

In order to provide integrated mica for use in the present method, the same, rather than being provided in sheets, is provided as a mass of flakes in the form of a brick or cylinder suitable to be placed in the can of a spray gun. Such a mass of virgin mica can easily be produced by collecting the flakes in a perforated receptacle instead of depositing the same on a pervious surface, as taught in my Patent No. 2,405,576. Since most of the liquid will run off through the perforations in the receptacle and the remainder will evaporate, the resultant mass comprises a block of moisture-free mica flakes. Such a mass of mica flakes will readily disintegrate in the presence of a small amount of water or other liquids, such as methyl alcohol, xylene, toluene, or like suspending medium. In any case, small amounts of such liquids may be added as the mass is stirred to cause the flakes to fall apart to form a suspension of liquid-borne virgin mica flakes that has a mushy and flowable consistency. This suspension of flakes can be sprayed in a fine stream under force of compressed air.

It is essential that the proportional amount of liquid be only large enough to form a sprayable suspension, thus minimizing the washing effect that excessive liquid may incur.

According to the invention and as shown in the drawing, the protective coating comprises a plastic layer applied to the surface of a material, at least two layers consisting of a suspension of liquid-borne mica flakes applied to the plastic layer, and a covering of lacquer or filler over and within the mica flakes.

An exemplary manner of practicing the present method is as follows:

The surfaces of the material to be coated are first treated with a plastic solution which may be applied in various ways but which is preferably sprayed on to provide an extremely thin layer sufficient to cover any impurities there may be on said surfaces.

While the outer surface of the plastic layer is still soft and tacky, layers of virgin liquid-borne mica flakes are applied thereon so that the flakes stick to the soft tacky surface. The layers of virgin or nascent mica thus deposited may be applied in various degrees of thickness. However, the preferred procedure is to apply a relatively thin layer to a thickness of at least two flakes, to permit said layer to dry somewhat or hasten the evaporation of most of the liquid by application of heat or moving air, and then apply layer after layer of mica in the same manner to obtain a desired thickness.

After the last layer of mica has been applied and the liquid evaporated therefrom, the lacquer coating is applied, as by spraying or brushing, to cover the mica and fill the interstices among the flakes, as above set forth.

Instead of spraying the mica layers onto a surface, the same may be brushed on. The mentioned mica brick or cylinder, when placed in a receptacle and disintegrated to the mushy flowable consistency above defined, comprises a suspension of mica flakes that can readily be picked up by a brush and deposited on a surface substantially in the same manner that conventional paints are deposited.

While the foregoing has been described to include the step of first coating a surface with a plastic solution, there are instances where this step may be omitted. I have found that nascent mica will suitably adhere to thoroughly clean surfaces of copper and brass. My experiments have shown that I can provide a highly efficient slot insulation of virgin mica flakes in the rotor of a high powered electrical machine without first lacquering the copper or brass.

Conventional mica paints embody a binder that completely surrounds each particle of mica in the paint. There is as much or more binder than mica in such paints, said binder representing the greater portion of the cost and weight of the paint. It is impossible to apply the mica of such paints separately. Consequently, it is impossible to place two or more consecutive layers of the mica in such paints upon a surface as can be done by the present method in which the layers of virgin mica flakes are applied independently of a binder. The lacquer or filler employed in the present method represents between two and five per cent of the weight of the coating and not the fifty or more per cent as in prior mica paints. This weight savings is material where large surfaces are to be coated.

In this disclosure and in the claims, the terms "virgin" and "nascent," as applied to mica flakes, are intended as synonymous and to differentiate from flakes that are so contaminated that the same will not re-cohere as will the flakes herein described.

Inasmuch as the components or ingredients of the coating all have a low specific gravity, said coating will be extremely light in contradistinction to protective paints using lead bases. The coating will be highly weather, heat and abrasive resistant, and, generally, will have the properties of mica. The coating will have many uses, and is particularly adapted to protect the surfaces of the structural members of buildings, bridges, ships, etc.

From the foregoing it will be seen that the objects of the invention have been fulfilled by providing a protective coating of great efficacy, and a novel method by means of which said coating is applied quickly and easily to the surfaces of various materials. However, this disclosure is intended only as by way of example and I, therefore, intend to reserve to myself such variations and modifications that may fall within the scope of my invention as claimed.

Having thus described my invention, what I claim and desire to obtain by Letters Patent is:

1. The method of protecting the surface of a solid which comprises applying an undercoat to the surface, applying to the undercoat a suspension consisting of integrated mica flakes and a readily evaporable liquid selected from the group consisting of water, methyl alcohol, xylene and toluene, said mica flakes being nascent and capable of cohering to each other, thereby depositing a layer of mica flakes onto the undercoated surface, evaporating the liquid vehicle from the layer of mica flakes, and applying and drying a lacquer onto the layer of mica flakes, thereby filling the interstices among the mica flakes.

2. The method of protecting the surface of a solid which comprises applying an undercoat to the surface, applying to the undercoat a suspension consisting of integrated mica flakes and a readily evaporable liquid selected from the group consisting of water, methyl alcohol, xylene and toluene, said mica flakes being nascent and capable of cohering to each other, thereby depositing a layer of mica to the thickness of at least two flakes onto the undercoated surface, evaporating the liquid vehicle from the layer of mica flakes, and applying and drying a lacquer onto the layer of mica flakes, thereby filling the interstices among the mica flakes.

3. The method of protecting the surface of a solid which comprises cleaning the surface of substantially all foreign matter, then applying on the cleaned surface a suspension consisting of integrated mica flakes and a readily evaporable liquid selected from the group consisting of water, methyl alcohol, xylene, and toluene, said mica flakes being nascent and capable of cohering to each other, thereby depositing a layer of mica flakes onto the cleaned surface, evaporating the liquid vehicle from the layer of mica flakes, and applying and drying a lacquer onto the layer of mica flakes, thereby filling the interstices among the mica flakes.

4. The method of protecting the surface of a solid which comprises cleaning the surface of substantially all foreign matter, then applying on the cleaned surface a suspension consisting of integrated mica flakes and a readily evaporable liquid selected from the group consisting of water, methyl alcohol, xylene and toluene, said mica flakes being nascent and capable of cohering to each other, thereby depositing a layer of mica to the thickness of at least two flakes onto the cleaned surface, evaporating the liquid vehicle from the layer of mica flakes, and applying and drying a lacquer onto the layer of mica flakes, thereby filling the interstices among the mica flakes.

MOSES D. HEYMAN.

REFERENCES CITED

The following references are of record in the file of this patent:

UNITED STATES PATENTS

| Number | Name | Date |
| --- | --- | --- |
| 1,200,041 | Speed | Oct. 3, 1916 |
| 1,228,371 | Haefely | May 29, 1917 |
| 1,807,206 | Frederick | May 26, 1931 |
| 2,055,507 | Shirley | Sept. 29, 1936 |
| 2,363,324 | Hill | Nov. 21, 1944 |
| 2,405,576 | Heyman | Aug. 13, 1946 |